United States Patent [19]

Barecki et al.

[11] 4,045,080
[45] Aug. 30, 1977

[54] FASTENING SYSTEM FOR REMOVABLE SEAT INSERT

[75] Inventors: Chester J. Barecki, Grand Rapids; Larry A. Wilkerson, Wyoming, both of Mich.

[73] Assignee: American Seating Company, Grand Rapids, Mich.

[21] Appl. No.: 738,566

[22] Filed: Nov. 3, 1976

[51] Int. Cl.² ............................................. A47C 27/00
[52] U.S. Cl. .................................... 297/283; 297/454
[58] Field of Search .............. 297/283, 450, 452, 454; 312/107.5, 216

[56] References Cited
U.S. PATENT DOCUMENTS 3,948,557  4/1976  Barecki .............................. 297/283

Primary Examiner—James C. Mitchell
Attorney, Agent, or Firm—Price, Heneveld, Huizenga & Cooper

[57] ABSTRACT

A removable insert for a transit chair shell has a plurality of studs protruding from the back of the insert. A plurality of openings in the chair shell receive the studs. A movable restraining means prevents withdrawal of the studs thereby securely positioning the insert to the chair shell. The restraining means is arranged to be moved longitudinally and rotationally and the insert removed without disassembly of the chair from its operational configuration.

11 Claims, 10 Drawing Figures

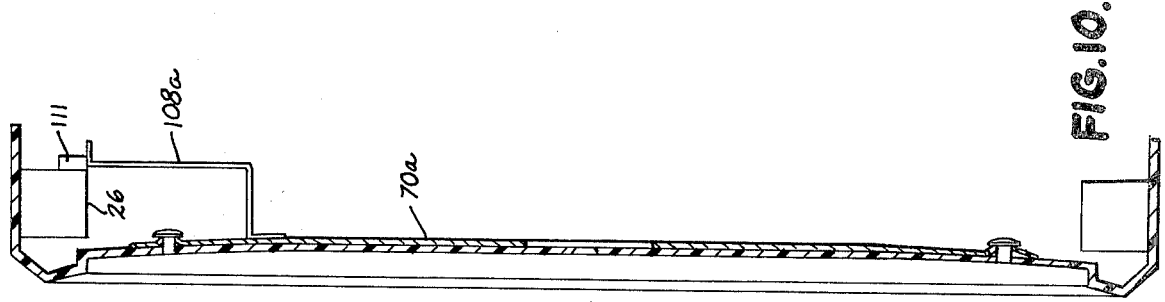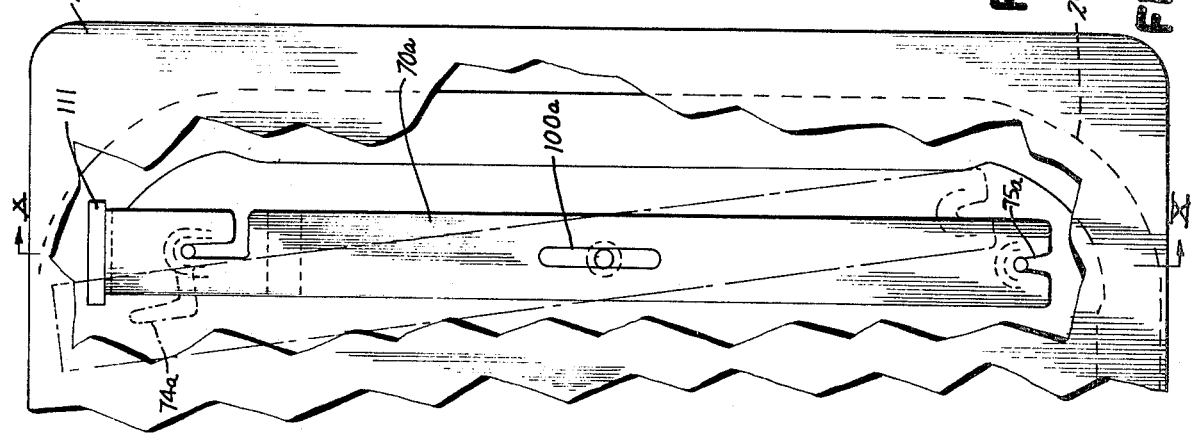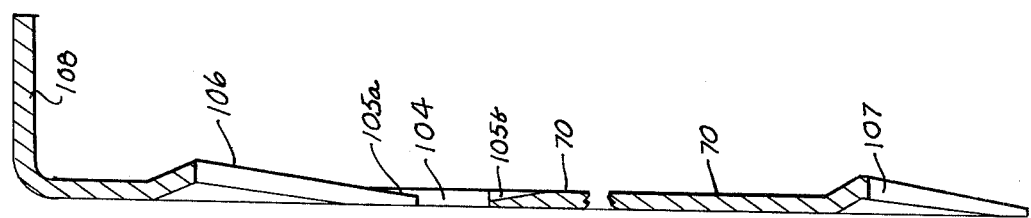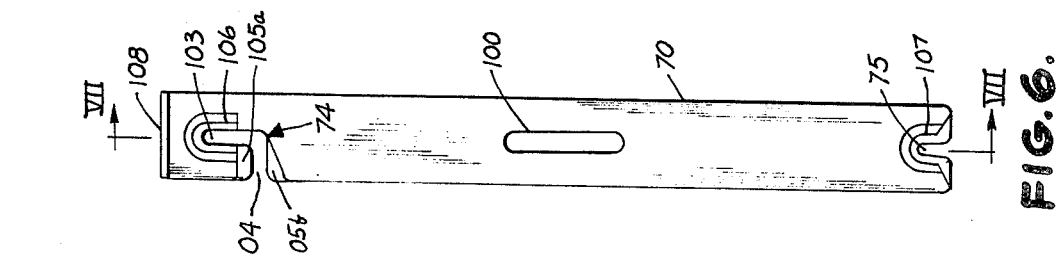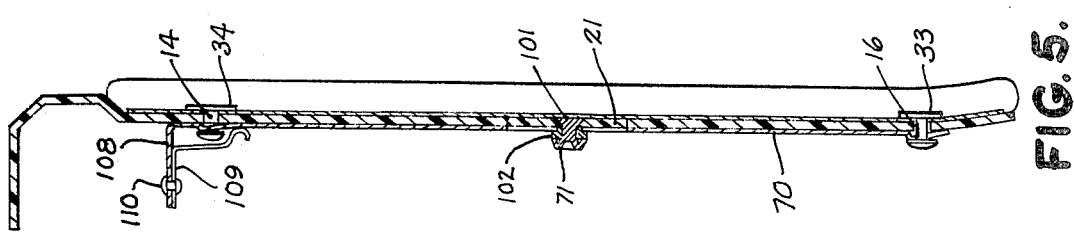

FASTENING SYSTEM FOR REMOVABLE SEAT INSERT

BACKGROUND OF THE INVENTION

The present invention relates to a transit seat which is particularly suited for use in a mass transportation vehicle, such as a bus or a rapid transit train.

Plastic shells have been used in transit seats, the principal advantages being in lower costs of maintenance and manufacturing. Also, inserts for plastic shells are known. Examples of such inserts are described in U.S. Pat. Nos. 3,737,198 and 3,797,887. The inserts may be padded for additional comfort so as to provide a somewhat more luxurious seat than a conventional plastic shell while maintaining the basic qualities of durability, economy, and ease of maintenance inherent in the plastic seats. The inserts further provide the ability to design a desired color scheme into the seat. In the event of vandalism to the inserts, which cover the largest exposed portion of the seat, an individual insert which is damaged can be removed and replaced.

The prior art teaches using several screws to secure the inserts to the plastic shell. Accordingly, to replace an insert the screws must be removed and replaced. Furthermore, a longitudinal seat is mounted with the seat back facing either the side walls or the back wall of a transit vehicle thereby requiring removal of the transit seat for access to the inserts securing screws. This may require removal of screws structurally mounting the transit seat to transit vehicle and the removal of adjoining trash shields and similar fittings surrounding the transit seat. Analogously, a transverse seat typically has a back cover secured by a plurality of screws which must be removed to obtain access to the screws holding in the insert. After the insert is replaced the back cover must again be secured by screws. A typical back cover for a two passenger seat has a number of screws exceeding ten. Thus, to remove one insert, a plurality of screws must be unscrewed and rescrewed. Further, the screws holding the back cover are typically self-threading and hold less tightly with successive rescrewings into the same hole. As a result, removal of an insert from either a transverse or longitudinal transit seat presents the possibility of loss of screws and replacement of the insert, the back cover and the seat frame with less than a full complement of screws. Replacement time is obviously related to labor costs and time out-of-service for the bus.

The prior art also includes U.S. Pat. No. 3,948,557 which teaches an elongated insert restraining bar, rotationally secured to the plastic shell, with notches rotated into position to engage studs protruding from the back of the insert. One end of the rectangular bar is engaged with a portion of the chair frame to prevent rotation of the insert restraining bar thereby coupling the insert to the plastic shell. This invention is an improvement of such patented construction.

It has been desirable to provide a fastening means for inserts for plastic shells which provides for correct replacement of the inserts while reducing labor cost and time out-of-service for the bus. The fastening means for inserts desirably restrains the insert when the insert is subjected to an operational environment including twisting and vibrational forces. Furthermore, it has been desirable to be able to use such a fastening means whenever replacement of inserts is desired because of wear, vandalism, a desire to change color schemes or some other reason.

SUMMARY

This invention provides for increased ease of installation by sequentially coupling an insert restraining means to spaced studs protruding from the insert. Thus, an installer's attention and efforts can be directed to a single operation instead of having to perform two simultaneous operations. Also, this invention requires for removing the insert two separate sequential movements of the insert restraining means in directions at an angle to each other. This substantially reduces the changes of accidental uncoupling of the insert due to vibrational and twisting forces. Also the effect of such forces is reduced by the eliminating of the coupling between the seat shell, the insert restraining means and the seat frame. In accordance with this invention, the insert restraining means is coupled only to the insert and the seat shell. Thus, relative motion or twisting of the seat frame with respect to the seat shell cannot cause the insert restraining means to move and cause releasing of the insert. Further, this invention provides for removal of an insert without removing the seat shell, the seat frame, the back cover or any screws for either a longitudinally or transversely mounted vehicle seat. In accordance with an embodiment of this invention, studs protrude from the back of the insert and engage openings in a plastic shell. A first set of openings can be of a keyhole slot type wherein a first set of studs can be inserted into a larger portion and then slid to a narrower portion thereby restraining the stud. A second set of openings permit a second set of studs to pass through the plastic shell and be positively engaged by an elongated insert restraining means. The insert restraining means is an elongated bar which is secured to the plastic shell to permit rotational movement and longitudinal movement and has a pair of notches for engaging the second set of studs and preventing their withdrawal through the second set of openings in the plastic shell.

A first notch in the bar includes a first longitudinal slot spaced from the sides of the rectangular bar and a connected transverse slot for first engaging a first stud of the second set of studs and permitting the stud to pass from the exterior of the rectangular bar to the longitudinal slot. A second notch includes a second longitudinal slot for engaging a second stud of the second set of studs by a longitudinal motion of the bar. As noted, it is of particular significance that the engagement of the first and second studs of the second set by the notches it sequential and an installer can concentrate his efforts on the engagement of a single stud instead of having to engage two studs simultaneously. More specifically, an installer can use one hand to press on the front face of an insert thus providing maximum extension of the stud beyond the shell. Simultaneously, the other hand can be used to position the bar so a notch engages only that stud. The bar can be rotated by a hand slipped behind a seat mounted against a transit vehicle wall and does not require either viewing of the bar or removal of a longitudinally mounted vehicle seat from a mounting adjacent a wall. Further, in accordance with an embodiment of this invention, the back cover of a transversely mounted chair has an opening through which a tool can be inserted to engage an opening in the bar and to rotate the bar. Since the back cover need not be removed, it can be riveted, instead of screwed, into place. Screws are not lost and correct securing of the insert is quickly accomplished. A firmly fastened back cover is desirable to shield a passenger from any insert fastening means. Further, the invention requires a low level of skill for replacing inserts and allows quick replacement thereby resulting in less out-of-service time for the bus and lower labor costs.

BRIEF DESCRIPTION OF THE DRAWINGS

FIG. 5 is a partial cross-sectional view of the seat back taken along section line V—V of FIG. 3;

FIG. 6 is a view of the elongated insert restraining element utilized in this invention;

FIG. 7 is a partial cross-sectional view of the element shown in FIGS. 3, 5 and 6 taken along section line VII—VII of FIG. 6;

FIG. 8 is a side view of an insert restraining means in accordance with an embodiment of this invention;

FIG. 9 is a bottom plan view, partially cut away, of a portion of the seat of a chair made in accordance with an embodiment of this invention; and FIG. 10 is a cross-sectional view taken along section X—X of FIG. 9.

DETAILED DESCRIPTION

Figure 1:
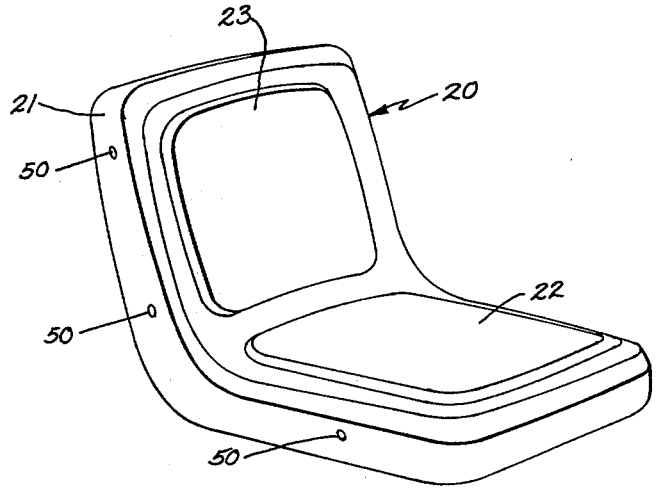
FIG. 1 is a frontal perspective view of a seat in accordance with an embodiment of this invention.
Figure 2:
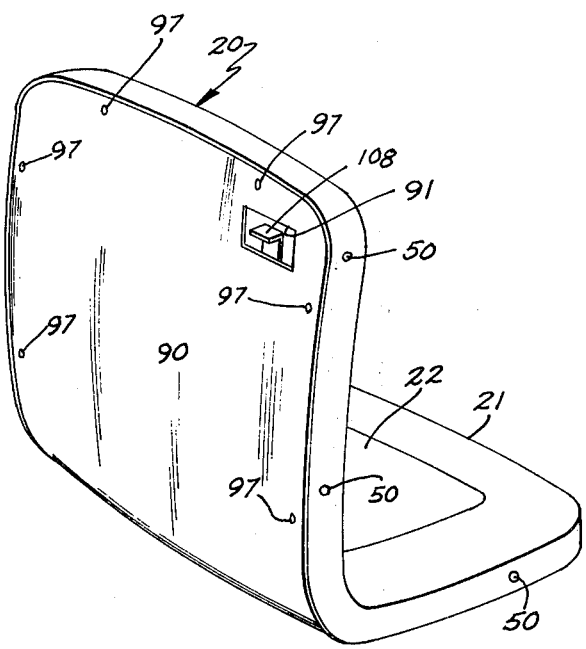
FIG. 2 is a rear perspective view of the seat of this invention.

Referring to the drawings, a seat 20 includes a one-piece contoured plastic shell 21 mounted on a tubular steel metal frame 26 (FIGS. 9 and 10) and held in place by pop rivets 50 (FIGS. 1 and 2). Such structure is of the type shown in greater detail by U.S. Pat. Nos. 3,737,198, 3,797,887, and 3,948,557, the disclosures of which are herein incorporated by reference. Mounted on shell 21 is a seat insert pad 22 and a back insert pad 23. When seat 20 is mounted longitudinally along the wall of a transit vehicle the back of the shell is typically left uncovered. However, when seat 20 is mounted transversely, the back of the shell is advantageously covered by a back cover 90. Back cover 90 is attached to frame 26 by fastening means 97.

As shown in FIG. 2, seat 20 has back cover 90 with an opening 91 aligned with a handle 108 of bar 70. Accordingly, a tool such as a screw driver or the fingers of a hand can be inserted through opening 91 to grasp handle 108 and longitudinally move and rotate retaining bar 70. Back cover 90 would typically be used when seat 20 is mounted transversely in a transit vehicle.

Figure 4:
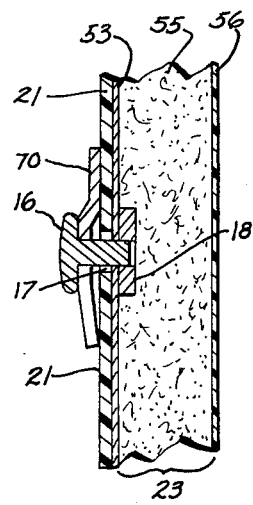
FIG. 4 is a partial, cross-sectional view along section line IV—IV of FIG. 3.

As best shown in FIG. 4, back insert pad 23 includes a thin metal inner liner 53, a layer of foam material 55, and an upper upholstery panel 56. Alternatively, this insert can be a molded plastic or any equivalent material. Back insert pad 23 also includes studs 10, 12, 14 and 16 protruding from the back of the insert and each having an enlarged head. These studs can be anchored to insert 23 by a weld nut attached to thin metal inner liner 53 or in the case of a plastic insert can be a T-nut having an internally threaded barrel portion. In FIG. 4, a weld nut 18, associated with stud 16, is shown in cross section. In FIG. 5, weld nuts 33 and 34, associated with studs 16 and 14, respectively, are shown.

Figure 3:
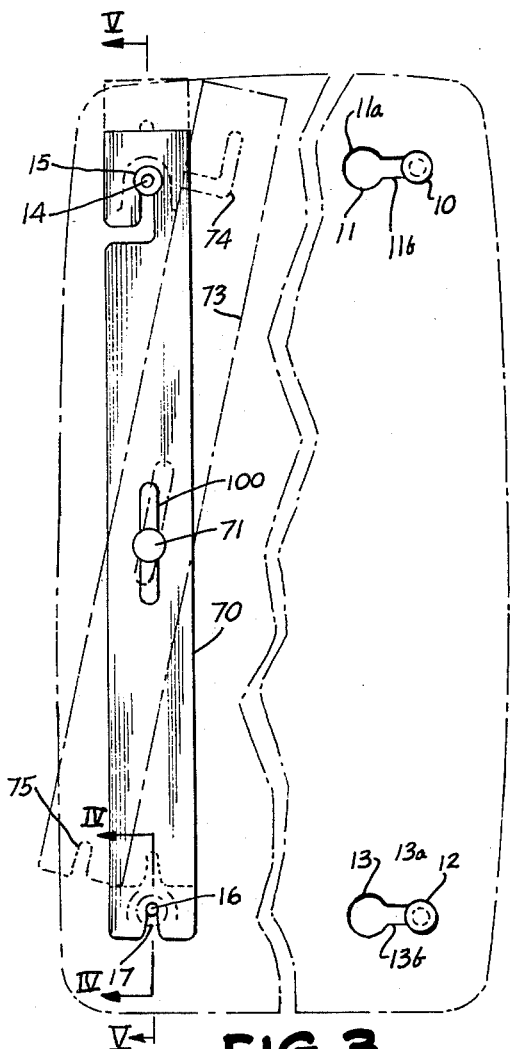
FIG. 3 is a schematic, broken rear elevation view of the interior of a seat back showing the elongated restraining bar for holding the seat insert in place.

As shown in FIG. 3, plastic shell 21 has an opening 11 aligned to receive stud 10, an opening 13 aligned to receive stud 12, and opening 15 aligned to receive stud 14, and an opening 17 (visible also in FIG. 4) aligned to receive stud 16. Openings 11 and 13 are key-shaped so that studs 10 and 12 can be inserted into receiving portions 11a and 13a, and then slid over to a narrow portion 11b and 13b, respectively. Once insert 23 is in this position, with studs 10 and 12 inserted, studs 14 and 16 are inserted into openings 15 and 17, respectively. Openings 15 and 17 are not slotted and restrain insert 23 from moving longitudinally so that studs 10 and 12 are thus prevented from being withdrawn through the receiving portions 11a and 13b of openings 11 and 13, until studs 14 and 16 are withdrawn from openings 15 and 17.

To prevent studs 14 and 16 from withdrawing through their respective openings, a retainer bar 70 is positioned around studs 14 and 16. Bar 70 is connected at a longitudinal central slot 100 to plastic shell 21 by pivot 71. Advantageously, pivot 71 includes a rivet 101 (FIG. 5) which is counter sunk into plastic shell 21 and secures a T-shaped shoulder washer 102 through central slot 100. The longitudinal, elongated shape of central slot 100 prevents the shoulder of shoulder washer 102 from passing through central slot 100 thereby securing retainer bar 70 to shell 21 while permitting rotation of retainer bar 70 and longitudinal movement of retainer bar 70 along central slot 100. To show rotation of bar 70, a dotted outline 73 of bar 70 is shown in an offset rotational position in FIG. 3. Bar 70 has an angled shaped notch 74 and a longitudinal notch 75 to engage studs 14 and 16, respectively. It can be appreciated that the distance between insert 23 and the heads of studs 10 and 12 need only be enough to clear the thickness of plastic shell 21. However, the same dimension on studs 14 and 16 must be sufficient to clear the thickness of plastic shell 21 and the thickness of bar 70 when engaged with the studs.

Angled notch 74 as best illustrated by FIGS. 6 and 7 includes a longitudinal slot 103 spaced from the sides of bar 70 and a connected transverse slot 104. Thus, as retainer bar 70 is rotated, stud 14 can be received by transverse slot 104 and the rotation of retaining bar 70 can be continued until stud 14 is aligned in the longitudinal slot 103. Longitudinal notch 75 has only a longitudinal portion and engages stud 16 by longitudinal motion of retaining bar 70. The edges of notch 74 surrounding the sides of transverse slot 104 are inclined at 105a and 105b to provide a ramp which facilitates the sliding of the head of stud 14 therealong as the stud moves through the slot. Longitudinal slot 103 has a taper so the width of longitudinal slot 103 decreases with increasing distance from the end which receives stud 14 and is connected to transverse slot 104 to the opposite end which is adjacent stud 14 when retaining bar 70 is in a secured position. Advantageously, the narrow end of longitudinal slot 103 is sufficient to engage the body and any threads of stud 14 thereby preventing motion due to vibration. The side edges of longitudinal slot 103 are also inclined providing a wedge shaped surface 106 (FIG. 7) along the sides of longitudinal slot 103 which increases in height as stud 14 is moved from the wide to the narrow end of longitudinal slot 103. This wedge shaped surface draws the insert tightly against the seat shell.

Longitudinal notch 75 has a taper similar to longitudinal slot 103 and decreases in width as stud 16 extends into longitudinal notch 75 from the open end of retaining bar 70 along the length of longitudinal notch 75. Also, longitudinal notch 75 has a wedge shaped surface 107 along the edge of longitudinal notch 75. Wedge shape surface 107 is typically formed by embossing and has an increasing height as stud 16 passes to the narrow end of longitudinal notch 75. Further, wedge shaped surface 107 has a transverse change in height and increases in height as distance increases transversely from longitudinal notch 75.

A cross section of retainer bar 70, stud 16 and insert 23 is shown in FIG. 4. As retainer bar 70 is longitudinally moved into position it can be seen that the leading edge of longitudinal notch 75 which is inclined acts as a wedge to positively draw insert 23 against plastic shell 21. The final thickness of retainer bar 70, when it abuts stud 16, should be such so there is a tight fit between stud 16, retainer bar 70, shell 21, and metal sheet 53 of insert 23.

Referring to FIG. 8, retainer bar 70 has an arcuate shape centered about central slot 100 so that the ends of retainer bar 70 are pressed against plastic shell 21 as pivot 71 draws the central portion of retainer bar 70 toward plastic shell 21. Retainer bar 70 is advantageously manufactured of a spring steel such as 16 gauge 1065 steel which is heat treated to Rockwell C. To readily grasp retainer bar 70 so it can be rotated and moved longitudinally, the extremity of retainer bar 70 adjacent angled notch 74 has an angled handle 108 which is typically just an extension of retainer bar 70 bent at a right angle to the remaining portion of retainer bar 70.

To further prevent movement of retainer bar 70 when angled notch 74 is engaging stud 14 a lock spring 109 (FIG. 5) is connected to handle 108 by a rivet 110. Lock spring 109 is resiliently deflected as the heat of stud 14 passes toward the narrow end of longitudinal slot 103 and then returns to its original position to resist the backward passage of stud 14. Of course, if it is desired to remove back insert pad 23, sufficient force can be used to overcome the spring bias of lock spring 109. Nevertheless, the typical vibrational forces of a transit vehicle would not be sufficient to overcome the force of lock spring 109 and permit disengagement of retainer bar 70 from the studs of back insert pad 23.

Referring to FIGS. 8 and 9, the retainer bar is adapted to secure a seat insert pad 22 by changing the position and shape of its handle. Frame 26 extends around the front bottom and side bottom of plastic shell 21 to provide support for seat 20 and thus it would normally interfere with handle 108. Therefore, a handle portion 108a of a generally Z-shape is welded to a retainer bar 70a at a point intermediate an angled notch 74a and a central slot 100a. Accordingly, the extremity of retainer bar 70a beyond angled notch 74a is shortened to clear frame 26. Handle 108a is bent to be spaced from frame 26 and extend parallel to retainer bar 70a toward frame 26. Except for the above changes, the retainer bar 70a is identical to retainer bar 70 previously described and therefore includes angled notch 74a, slot 75a, central slot 100a with the means for rotatably supporting the bar, all as previously described. If desired, a protrusion 111 extends outward from frame 26 to prevent longitudinal movement of handle 108a and retainer bar 70. When it is desired to move retainer bar 70, handle 108a is pulled downwardly out of engagement with protrusion 111 so it clears protrusion 111 and slides across protrusion 111.

OPERATION

An insert can be secured into place by very simple steps. Retainer bar 70 is positioned so notches 74 and 75 are offset from openings 15 and 17, respectively. This can be done by reaching a hand around the top, sides, or bottom of a seat longitudinally mounted along the wall of a transit vehicle. Note that this operation can be performed without being able to see retainer bar 70. If desired, the position and length of central slot 100 can be such that when pivot 71 abuts one end of central slot 100, transverse slot 104 is correctly positioned adjacent opening 15 and in position to receive stud 14. Alternatively, this can be done by inserting a tool or fingers through opening 91 in back 90 and engaging handle 108 of retainer bar 70. Studs 10 and 12, having a body length sufficient just to clear the thickness of shell 21, are inserted into openings 11 and 13, respectively. Insert 23 is slid so the narrow slot portions of openings 11 and 13 receive studs 10 and 12, respectively. Studs 14 and 16 are then aligned with openings 15 and 17, respctively, and are next inserted through shell 21.

With studs 14 and 16 protruding beyond the back of shell 21, retainer bar 70 is rotated so stud 14 enters and passes along transverse slot 104. Once stud 14 has traveled the length of transverse slot 104 longitudinal motion of retainer bar 70 is started and stud 16 approaches the narrow end of longitudinal notch 75 and stud 14 approaches the narrow end of longitudinal slot 103. If a spring lock 109 is part of retainer bar 70 as illustrated for the back in FIG. 5 longitudinal motion is continued until lock spring 109 passes over the head of stud 14 and stud 14 reaches the extremity of longitudinal slot 103. If retainer bar 70 includes a handle 108a as illustrated for the seat in FIGS. 9 and 10, longitudinal motion of retainer bar 70 is continued until handle 108a passes over protrusion 111.

Securing an insert is a particularly easily operation because retainer bar 70 does not have to be seen and studs 14 and 16 are sequentially brought into notches 74 and 75. That is, attention can first be focused on inserting stud 14 into angled notch 74. Typically, this requires applying pressure on back insert pad 23 to extend stud 14 beyond plastic shell 21. Once stud 14 is in transverse slot 104 attention can be focused on extending stud 16 far enough beyond plastic shell 21 so it can be engaged by longitudinal notch 75, which is properly aligned because of the positioning of retainer bar 70.

Removing insert 23 is also a relatively simple process. A person must simply longitudinally move retainer bar 70 by overcoming any retaining force that is used to secure retainer bar 70 against accidental movement caused by such forces as vibration. This frees stud 16. Retainer bar 70 is rotated to free stud 14. Studs 14 and 16 are retracted through openings 15 and 17, respectively, by lifting one side of back insert pad 23. Insert pad 23 is then slid along the slots of openings 11 and 13 until studs 10 and 12 are aligned with the larger portions of openings 11 and 13, respectively. Withdrawal of studs 10 and 12 through their respective openings disengages insert 23 from shell 21.

Various modifications and variations will no doubt occur to those skilled in the various arts to which this invention pertains. For example, elongated fastening means extending from the insert may vary in shape from the studs as described. Also, the retainer bar may be movably mounted by means other than a centrally located pivot. These and all other variations which basically rely on the teachings through which this disclosure has advanced the art are properly considered within the scope of this invention.

The embodiments of the invention in which an exclusive property or privilege is claimed are defined as follows.

1. In a seat having a rigid plastic shell and means for fastening said insert to the shell, the improvement comprising:
   studs secured to and protruding from the back of said insert, said studs having a shank portion and an enlarged head;
   said shell having openings for receiving said studs, said openings being sufficiently large to receive the heads of said studs;
   an elongated retainer member mounted on said shell for movement in two sequential first and second directions extending at angles from each other so said retainer member can be positioned in a retaining position and a non-retaining position;
   said retainer member having notched portions one for receiving each of said shanks of said studs, so that the retainer member is located between the heads of said studs and said shell, at least one of said notched portions in the retaining position of said retainer member having a first slot portion extending in one of said directions and a second connecting slot portion communicating with said first slot and extending in the other of said directions whereby when said retainer is moved from the non-retaining position to the retaining position one of said studs enters and passes through said first slot portion as said retainer is moved in said first direction and thereafter enters and passes into said second slot as said retainer member moves in said second direction.

2. A passenger seat for a mass transit vehicle comprising:
   a frame;
   a one-piece rigid plastic shell mounted on the frame, and having a first pair of interior boundaries defining a first pair of mounting openings each opening having a head receiving portion and a connected slot portion; said head receiving portion being sufficiently large to pass the head of a mounting stud; said connected slot portion being narrower than the width of said head for retaining said stud in said slot portion; and a second pair of interior boundaries defining a second pair of mounting openings, each opening having an entry portion sufficiently large to pass the head of a mounting stud;
   an insert having elongated fastening means; said insert being mounted to the shell so the elongated fastening means extend through the mounting openings; said elongated fastening means including a first pair of studs positioned to be aligned with the first pair of mounting openings and each stud having a head, each head being spaced from the insert a distance equal to about the thickness of the shell; said fastening means each including a stud shank between the head and the insert, the shank being narrower than the head; a second pair of studs positioned to be aligned with the second pair of mounting openings when the first pair of studs is located within the slot portions of the first pair of openings; said second studs each having a head spaced from the insert a distance greater than the thickness of the shell and having a stud shank between the head and the insert, the shank being narrower than the head;
   an insert restraining means for securing at least some of the elongated fastening means to prevent movement of the elongated fastening means back through the mounting openings of the shell; the insert restraining means including a movable member which is movably mounted to the plastic shell, the movable member having a first position permitting insertion of the elongated fastening means through the mounting openings and a second position preventing the withdrawal of the elongated fastening means through the mounting openings; and
   said insert restraining means including an enlongated flattened bar having a central portion secured to the shell to permit rotational movement and longitudinal movement of said bar with respect to said shell, said bar having first and second notches of a width for receiving the shanks of the second pair of studs; said notches being positioned so each notch can sequentially engage one of the second pair of studs; said first notch including a first transverse slot connected to a longitudinal slot for passing a stud from the exterior of said bar to said transverse slot and then to said longitudinal slot for receiving a stud by sequential rotational and longitudinal motion, and said second notch including a longitudinal slot for engaging a stud by longitudinal motion.

3. An insert restraining means as recited in claim 2 wherein:
   said first longitudinal slot tapers in width so the width decreases with increasing distance from said transverse slot, for engaging the shank of a stud inserted into said first longitudinal slot; and
   said second longitudinal slot tapers in width so the width decreases with increasing distance from a slot extremity first receiving a stud, for engaging the shank of a stud inserted into said second longitudinal slot.

4. An insert restraining means as recited in claim 3 further comprising:
   a first wedge-shaped means alongside said first longitudinal slot and increasing in height along said first longitudinal slot as said first longitudinal slot decreases in width for engaging the head of a stud thereby drawing said insert toward said plastic shell; and
   a second wedge-shaped means alongside said second longitudinal slot and increasing in height along said second longitudinal slot as said second longitudinal slot decreases in width, for engaging the head of a stud thereby drawing said insert toward said plastic shell.

5. An insert restraining means as recited in claim 4 further comprising:
   a lock spring means coupled to said bar, elastically biased toward said bar, and positioned to engage a stud head as it passes along a notch, for providing a resisting force to the passage of a stud thereby opposing the tendency of vibratory forces to move said bar in relation to a stud.

6. A passenger seat for a mass transit vehicle as recited in claim 4 further comprising:
   a protrusion extending from said frame; and
   a handle coupled to said bar and positioned to abut said protrusion, for providing a location to apply a force to said bar thereby moving said bar and for applying a force from said protrusion for resisting the tendency of vibratory forces to move said bar in relation to a stud.

7. A seat as recited in claim 5 further comprising a back piece covering the back of the shell and secured to the frame, the back piece having an opening aligned with a portion of said bar, the opening in the back piece extending along a longitudinal and transverse path described by the bar as the bar moves, and large enough to pass a force applying means for engaging the bar and causing sufficient longitudinal movement and rotational movement of the bar so the notches in the bar can clear the second pair of studs in a first position and engage the second pair of studs in a second position.

8. In a seat having a frame, a one-piece rigid plastic shell mounted on the frame and an insert fastened to the shell the improvement comprising:

fastening means for fastening the insert to the shell including:

studs, with heads, protruding from the back of the insert;

interior boundaries of the shell defining openings through the shell aligned with the studs, each opening having a portion large enough to receive the head of the stud and at least one opening having a narrower slot to engage the head;

an elongated insert retainer member; support means for said retainer member movably supporting said retainer member to the shell by a central, elongated slot receiving said support means and aligned parallel to the longitudinal axis of said insert retainer for permitting longitudinal and rotational movement of said retainer member; said retainer member having at least one notched portion with connected longitudinal and transverse slots for receiving a stud; said retainer member having an end portion biased against said notched portion for applying a force to resist movement of a stud along said longitudinal slot; said seat being characterized in there being no connection between said frame and said insert retainer.

9. A seat comprising:

a plastic shell having a first keyhole mounting opening having a receiving portion and a connected, narrower slot portion, and a second mounting opening;

an insert mounted on the shell, the insert having a first stud protruding from the back side, the first stud having a nail-like head portion narrower than the receiving portion of the first keyhole mounting opening and wider than the slot portion of the first keyhole mounting opening, having a body portion between the head portion and the insert, and being positioned in the slot portion of the first keyhole mounting opening, the insert further having a second stud protruding from the back side and aligned with the second mounting opening, the second stud having a nail-like head portion narrower than the second mounting opening and a body portion, between the head portion and the insert, narrower than the head portion and positioned in the second mounting opening; and an elongated restraining means movably connected to the shell by a securing pivot through an elongated opening in said restraining means, thereby permitting rotational movement and longitudinal movement along said elongated opening, said restraining means having a first notched portion aligned to engage the body of the second stud thereby preventing withdrawal of the second stud through the second mounting opening, said first notched portion including a longitudinal slot, having a longitudinal axis parallel to the longitudinal axis of said elongated opening, and a connected transverse slot, having a longitudinal axis generally perpendicular to the longitudinal axis of said elongated opening, said transverse slot extending between the outer boundary of said restraining means and said longitudinal slot.

10. A seat as recited in claim 9 wherein said longitudinal slot decreases in width from said transverse slot to an extremity of said longitudinal slot away from said transverse slot and has a wedge-shaped boundary which increases in height from said transverse slot to an extremity of said longitudinal slot away from said transverse slot, for engaging said stud and biasing said insert toward said shell.

11. A seat as recited in claim 10 further comprising:

a third mounting opening in said plastic shell;

a third stud protruding from the back side of said insert, positioned to be aligned with said third mounting opening; and a second notched portion in said elongated restraining means aligned to engage the body of said third stud thereby preventing withdrawal of said third stud through said third mounting opening, said second notched portion having a longitudinal axis parallel to the longitudinal axis of said elongated opening, remaining clear of said third stud when said second stud is in said transverse slot and engaging said third stud when said second stud is engaged by said longitudinal slot of said first notched portion.

* * * * *